Nov. 15, 1927.

F. A. STEVENS

OPHTHALMIC MOUNTING

Original Filed Aug. 5, 1921

1,649,796

Inventor:-
Frederick A. Stevens.

by David Rines
Attorney:-

Patented Nov. 15, 1927.

1,649,796

UNITED STATES PATENT OFFICE.

FREDERICK A. STEVENS, OF PROVIDENCE, RHODE ISLAND, ASSIGNOR TO BAUSCH AND LOMB OPTICAL COMPANY, OF ROCHESTER, NEW YORK, A CORPORATION OF NEW YORK.

OPHTHALMIC MOUNTING.

Original application filed August 5, 1921, Serial No. 489,947. Divided and this application filed January 15, 1924, Serial No. 686,313. Renewed June 28, 1926.

The present invention relates to ophthalmic mountings comprising non-metal members, such as temples and lens-holding frames, that are connected together by metal hinges, and it has for its object to secure the hinges in place upon the non-metal members in a new and improved manner. The present application is a division of a copending application, Serial No. 489,947, filed August 5, 1921.

Figure 1:
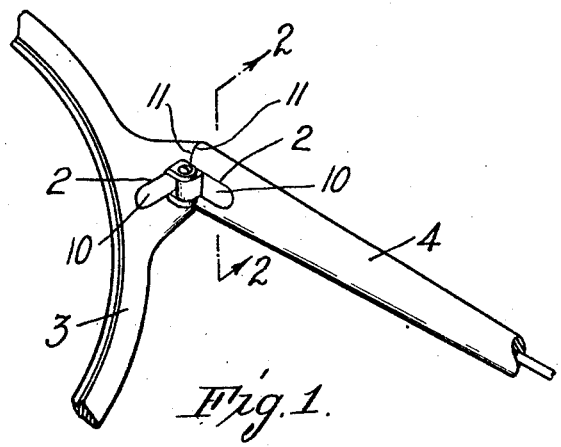
Figure 2:
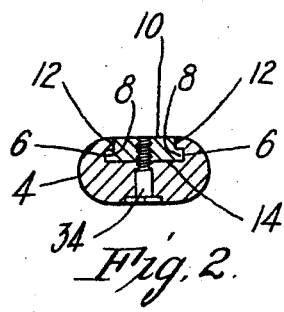

In the accompanying drawings, Fig. 1 is a fragmentary perspective view of an ophthalmic mounting comprising a lens-holding frame and a temple hinged thereto according to the present invention; Fig. 2 is a section taken upon the line 2—2 of Fig. 1; and Figs. 3 to 6 are similar views of modifications.

In commercial ophthalmic mountings of the above-described character, the pivotally connected hinge plates of the metal hinges have hitherto been secured to the non-metallic members by pairs of rivets passing through the hinge plates and the members. These have not been fully satisfactory. It has been proposed to mount beveled hinge plates in previously prepared beveled grooves of the non-metallic members, and to hold them in place by cement, or by single screws. There is a tendency, however, during the torsional movement of the temple, for the beveled walls of the hinge plates to twist or turn in their grooves, causing them to bite into the beveled-groove walls and weakening the brittle, non-metallic material, so that the joint ultimately becomes very loose.

Figure 3:
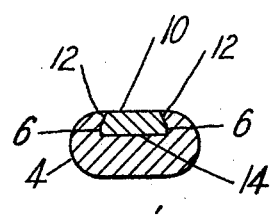
Figure 4:
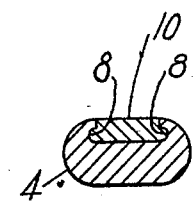
Figure 5:
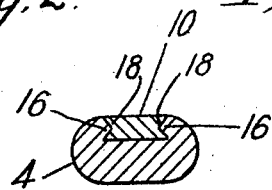
Figure 6:
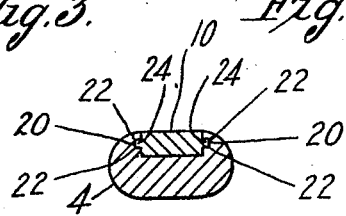

According to the present invention, the hinge-plate-receiving recess 2 of the non-metal member, such as a lens-receiving frame 3, or a temple 4, is provided with oppositely disposed, blunt side walls 6, and the walls 8 of the hinge plate 10 in contact with the walls 6 are correspondingly blunt, so that twisting or turning of the hinge plate within its groove is prevented. The lens-receiving frame 3 and the temple 4 are shown provided with beveled end faces 11 that are adapted to engage when the temple occupies its open position, as illustrated in Fig. 1, to limit the pivotal movement of the temple. To prevent the hinge plate falling transversely out of its recess, the mouth of the recess is made narrower than its maximum width. The hinge plate may be inserted in the recess by sliding it through an open end of the recess, or in any other desired manner. The portions 12 of the walls 6 near the mouth of the recess may be parallel to the portions of the walls 6 near the bottom wall 14, as shown in Fig. 2, or they may be inclined, as is shown in Fig. 3. The portions of the walls 6 near the bottom wall 14 may be rounded, Fig. 4. In all such cases, the recess is T-shaped in cross section. Both the upper and the lower portions of the walls 6 may be oppositely inclined, Fig. 5, providing non-metallic tongues 16 lying in correspondingly shaped grooves 18 of the hinge plate. The structure of Fig. 5 may be reversed, Fig. 6, but the groove 20 in the non-metallic material must then be made sharp-cornered at 22 or round to prevent the metal tongues 24 biting into the non-metallic material and ultimately causing a loose joint. Longitudinal movement of the hinge plate within the recess may be prevented by the use of cement or, preferably, by the use of single rivets or screws 34. A hinge plate so mounted can not accidentally be separated from its temple, and it cannot twist or otherwise become loosened.

The invention is not restricted to the exact embodiments thereof that are illustrated and described herein, but is subject to modification within the spirit and scope of the appended claims.

What is claimed is:

1. An ophthalmic mounting comprising a member constituted of non-metal material having a recess provided with a bottom wall and blunt side walls, the blunt side walls being substantially at right angles to the bottom wall near the bottom wall, the side walls being closer together at the mouth than at the bottom of the recess, whereby the mouth of the recess is narrower than the maximum width of the recess, and a hinge plate seated within the recess having blunt walls in contact with the blunt walls of the recess.

2. An ophthalmic mounting comprising a member constituted of non-metal material having a recess provided with a bottom wall and blunt side walls, the blunt side walls being substantially at right angles to the bottom wall near the bottom wall, the side walls being closer together at the mouth than at the bottom of the recess, whereby the mouth of the recess is narrower than the maximum width of the recess, a hinge plate seated within the recess having blunt walls in contact with the blunt walls of the recess, and means for securing the hinge plate within the recess.

3. An ophthalmic mounting comprising a member constituted of non-metal material having a recess provided with a bottom wall and blunt side walls, the side walls being closer together at the mouth than at the bottom of the recess, whereby the mouth of the recess is narrower than the maximum width of the recess, and a hinge plate seated within the recess having walls in contact with the blunt walls of the recess, the closer-together portions of the walls near the mouth of the recess being parallel to the portions of the walls near the bottom wall of the recess.

4. An ophthalmic mounting comprising a member constituted of non-metal material having a recess provided with a bottom wall and blunt side walls, the side walls being closer together at the mouth than at the bottom of the recess whereby the mouth of the recess is narrower than the maximum width of the recess, the portions of the walls near the mouth of the recess being parallel to the portions of the walls near the bottom wall of the recess, and a hinge plate seated within the recess having walls in contact with the blunt walls of the recess, several of the hinge-plate walls constituting tongues biting into the non-metal material.

5. An ophthalmic mounting comprising two members, a hinge comprising a plurality of pivotally connected hinge plates, each member having a recess provided with a bottom wall and blunt side walls, the blunt side walls being substantially at right angles to the bottom wall near the bottom wall, whereby the mouth of each recess is narrower than the maximum width thereof, one of the hinge plates being seated within each recess, and the hinge plates having blunt walls in contact with the blunt walls of the recess.

6. An ophthalmic mounting comprising a lens-receiving frame and a temple constituted of non-metal material, a hinge pivotally connecting the temple to the frame and comprising two pivotally connected hinge plates, the frame and the temple each having a recess provided with a bottom wall and blunt side walls, the blunt side walls being substantially at right angles to the bottom wall near the bottom wall, whereby the mouth of each recess is narrower than the maximum width thereof, one of the hinge plates being seated within each recess, the hinge plates having blunt walls in contact with the blunt walls of the recess, and the frame and the temple being provided with beveled end faces that are adapted to engage to limit the pivotal movement of the temple.

7. The hingedly connecting of temples to the frame of spectacles, consisting in arranging recesses of T shape in cross section in one face of the temples and extending inward from the butt end and in a face of the frame extending inward from the lateral marginal portion thereof, providing hinge members arranged with a leaf and a perforated knuckle extending at a right angle to each other, the leaf having a cross sectional form to correspond with the cross sectional shape of the recesses, interengaging the knuckles of the hinge members and engaging a pintle in the perforations of the interengaged knuckles, and then connecting the temples to the frame by engaging the leaf of one hinge member in the recess in the temples and engaging the leaf of the other hinge member in the frame recess.

8. An ophthalmic mounting comprising a member having a recess that is T-shaped in cross section, and a hinge member in the recess having a leaf and a knuckle, the leaf having a cross-sectional form to correspond with the cross-sectional shape of the recess.

9. In a hinge for connecting the temples to the frame of spectacles, a pair of hinge members, each hinge member including a leaf and a knuckle integral with the leaf, the knuckles being arranged with pintle-engaging perforations, and the leaf being T-shaped in cross section.

In testimony whereof, I have hereunto subscribed my name this 10th day of January, 1924.

FREDERICK A. STEVENS.